United States Patent [19]

Clem

[11] 4,087,365

[45] May 2, 1978

[54] SUPER-YIELD BENTONITE BASE DRILLING FLUID

[75] Inventor: Arthur G. Clem, Des Plaines, Ill.

[73] Assignee: American Colloid Company, Skokie, Ill.

[21] Appl. No.: 693,839

[22] Filed: Jun. 8, 1976

Related U.S. Application Data

[63] Continuation-in-part of Ser. No. 436,931, Jan. 28, 1974, abandoned.

[51] Int. Cl.$^2$ ................................................ C09K 7/02
[52] U.S. Cl. ................................. 252/8.5 A; 252/8.5 C
[58] Field of Search ............................ 252/8.5 A, 8.5 C

[56] References Cited

U.S. PATENT DOCUMENTS

| | | | |
|---|---|---|---|
| 2,552,775 | 5/1951 | Fischer et al. | 252/8.5 |
| 2,702,788 | 2/1955 | Dawson | 252/8.5 |
| 2,718,497 | 9/1955 | Oldham et al. | 252/8.5 |
| 3,558,545 | 1/1971 | Lummus | 252/8.5 X |

FOREIGN PATENT DOCUMENTS

| | | | |
|---|---|---|---|
| 535,786 | 1/1957 | Canada | 252/8.5 |
| 553,011 | 2/1958 | Canada | 252/8.5 |

OTHER PUBLICATIONS

Scanley, Article in World Oil, July 1959, pp. 122, 124, 126, and 128.

*Primary Examiner*—Herbert B. Guynn
*Attorney, Agent, or Firm*—Mason, Kolehmainen, Rathburn & Wyss

[57] ABSTRACT

A super-yield bentonite base drilling fluid composition is provided having a yield of more than 500 barrels per ton of bentonite, comprising water, bentonite clay, and a partial calcium salt of polyacrylic acid in an amount greater than about 7% by weight based on the total weight of bentonite. The fluid exhibits excellent viscosity, gelation and filtrate loss characteristics at extremely low bentonite levels.

6 Claims, 1 Drawing Figure

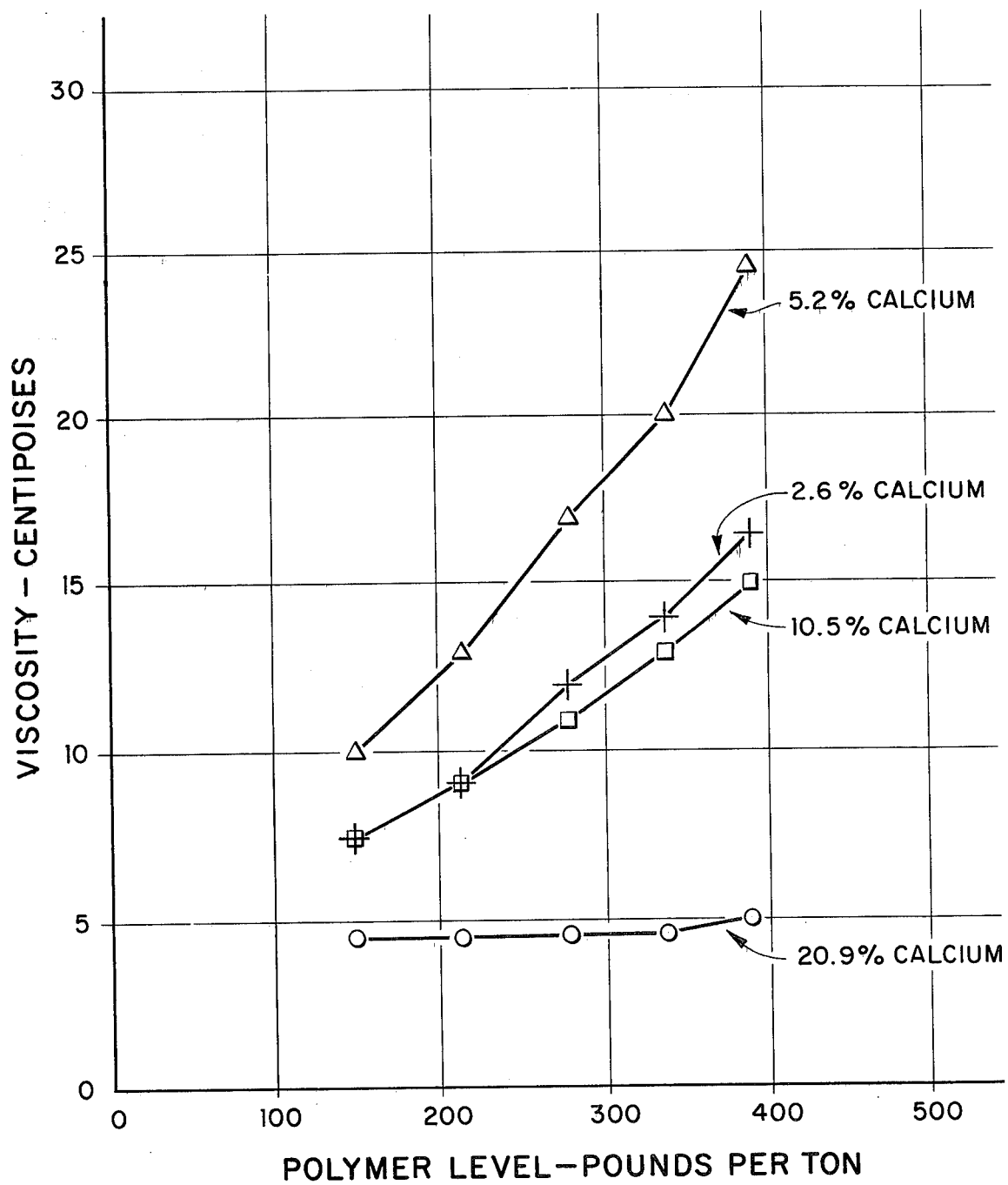

SUPER-YIELD BENTONITE BASE DRILLING FLUID

This is a continuation-in-part of application Ser. No. 436,931, filed Jan. 28, 1974, now abandoned.

FIELD OF THE INVENTION

This invention relates to a drilling fluid and more particularly to a super yield drilling fluid containing bentonite clay and greater than about 7% of a partial calcium salt of polyacrylic acid and/or a partial calcium salt of sodium polyacrylate, neutralized with calcium in an amount less than 15%. The polymer enables the drilling fluid to reach a high viscosity at very low bentonite loading to provide a drilling fluid at a yield of more than 500 barrels per ton of bentonite.

DESCRIPTION OF THE PRIOR ART

Drilling fluids are used in the drilling of wells for the recovery of oil, gas, or water. The practice is to recirculate a fluid called a "drilling mud" down through a hollow drill pipe, across the face of the drill bit, and upward through the drill hole. The drilling mud serves to cool and lubricate the drill bit, to raise the drilling cutting to the surface and to seal the sides of the well to prevent loss of water and drilling fluid into the formation surrounding the drill hole. The drilling mud must have both proper viscosity and some degree of gelation to carry the drilled solids to the surface, over a screen to remove the large chips, and to remove sands in a settling basin.

Bentonite is the most widely used thickening agent. The solids content of a typical water based drilling fluid is in the range of about 5–7% bentonite, the balance being water, chemical additives and finely divided drilled solids. Recently, the use of low-solids drilling fluids in well drilling has increased because of the faster rates which can be obtained thereby. In general, the lower the concentration of colloidal solids, the faster the drilling rate. However, the drilling mud must have a minimum degree of viscosity and gelation to carry the drilled solids to the surface. It is therefore a primary goal in the making of a drilling fluid to achieve a fluid having the required viscosity and gelation with the minimum amount of colloidal solids.

One inovation in the use of low-solids drilling fluids is in the addition of polymers and co-polymers to heavily peptize the bentonite in the fluid. Some of these polymers have produced a doubling or even tripling of the normal viscoisty of the bentonite drilling fluid to achieve acceptable viscosity and gelation characteristics at a bentonite loading corresponding to a yield of almost 270 barrels per ton of bentonite. The Lummus U.S. Pat. Nos. 3,558,545 and 3,323,603 disclose that the addition of a co-polymer of acrylic acid-acrylamide can achieve a maximum bentonite yield of about 267 barrels per ton.

While these typical prior art drilling fluid compositions achieve higher yields at acceptable viscosity and gelation levels, the polymers are generally added in a very low concentration, for example about 1% or less, that is, about 5 pounds of polymer per ton of bentonite. The addition of greater quantities of polymer actually causes a decrease in viscosity.

The addition of polymeric additives to a drilling mud composition first causes a rise in viscosity when added to bentonite. On further addition of polymer, the viscosity falls with simultaneous precipitation of the polymer. This is due to the fact that the polymer becomes a flocculant rather than a dispersing agent for the bentonite. Rather than increasing the gelation characteristic of the bentonite and increasing the viscosity, the polymer causes a precipitate to form and the viscosity and gelation characteristics of the composition to decrease.

The increase in the viscosity and the gelling characteristics of the drilling fluid are highly desirable for a number of reasons. By increasing the viscosity and gelling characteristics of the drilling fluid, less solids are needed in making a drilling fluid having the same lifting characteristics as a fluid containing a much higher percentage of bentonite. With less solids in the drilling composition, the bit life is increased. Increased bit life provides savings both in the cost of the bits and in labor since it is unnecessary to change bits so often. Increased bit life, can be the principal benefit. Further, a lower percentage of expensive colloidal bentonite is needed.

The typical prior art patents which disclose the addition of a polymer to a bentonite drilling fluid for the purpose of increasing the viscosity and gelling characteristics teach that there is a minimum and a maximum amount of polymer useful in a drilling mud composition. This is true whether the polymer is added to the bentonite or added to the drilling fluid containing the bentonite.

There is a good reason for the prior art disclosing a particular percentage range in which the polymer addition is effective. Below the minimum that is specified, the polymer virtually has no influence on the viscosity and gelling characteristics of the bentonite. Within the range, performance is excellent. As more polymer is added, there is a significant loss of viscosity and gelling action. The prior art therefore teaches using very small amounts of polymer — almost always less than 5%. The fall in viscosity and gelation has caused the user to halt his polymer additions.

Another reason why the prior art does not add more than about 5% polymer is because it was thought that a specified minimum amount of bentonite per barrel was necessary for the purpose of preventing undue fluid loss to the surrounding formation.

A more recent inovation is the use of the polymers by themselves to thicken water for use as a well drilling fluid. The difficulty with these fluids is that because of the large quantity of water and because of the particular polymers used, there is a very high rate of loss of water and drilling fluid through the surrounding earth formation.

SUMMARY OF THE INVENTION

An object of the present invention is to provide a new and improved drilling fluid for carrying drilled solids to the surface of a well.

Another object of the present invention is to provide an ultra-high yield bentonite drilling fluid having viscosity, water loss, and gelling characteristics of a bentonite fluid containing many times more bentonite.

Another object of the present invention is to provide a new and improved drilling fluid having a lower solids content than drilling fluids heretofore known in the art.

Another object of the present invention is to provide a new and improved method of drilling a well, including the circulation of a novel drilling fluid to provide a faster rate of drilling than heretofore known in the art.

Another object of the present invention is to provide a new and improved drilling fluid having a lower solids content than drilling fluids heretofore known in the art, while at the same time achieving a filtrate loss lower than that of drilling fluids having 4 to 5 times more solids.

Briefly, the drilling fluid composition of the present invention comprises an aqueous fluid containing bentonite and about 7-50%, based on the total weight of bentonite, of a partial calcium salt of polyacrylic acid and/or a partial calcium salt of sodium polyacrylate. By adding one or more polymers to an aqueous bentonite suspension in an amount as high as 7-50%, based on the total weight of bentonite, it has been found that yields of more than 500 barrels per ton of bentonite can be obtained.

Not only can I achieve a yield of 670 or more barrels of drilling fluid per ton of bentonite, but I have found that at polymer loadings of about 7-50%, the filtrate loss is greatly lessened. A yield of 500 barrels of drilling fluid per ton of bentonite can be easily achieved with a partial calcium salt of polyacrylic acid or a partial calcium salt of sodium polyacrylate, or mixtures thereof. The degree of partial calcium neutralization should be in the range of 1 to 15%. To achieve the full advantage of the present invention, the amount of calcium neutralization should be at least 2% and preferably at least 3%. Never before has a polymer been added to a drilling fluid in such a large quantity.

The drawing is a graph representing the effect of various levels of addition of partial calcium salts of polyacrylic acid on the viscosity of a bentonite-based drilling fluid.

DETAILED DESCRIPTION OF THE INVENTION

By adding about 7-50% based on the total weight of bentonite of a polyacrylic acid or sodium polyacrylate polymer neutralized to the calcium acrylate in an amount in the range of 1-15%, an excellent ultra-low solids drilling fluid can be obtained which exhibits a 30-minute filtrate loss as low as drilling fluids with five times as much solids. At first, addition of polymer in amounts beyond that disclosed by the prior art causes a decrease in the viscosity as shown in Table I. Unexpectedly, however, further polymer addition of the partial calcium salt increases the viscosity significantly more than polyacrylic acid (Table I).

TABLE I

| VISCOSITY CHANGES AS FUNCTION OF POLYMER LOADING | |
|---|---|
| Base Fluid: 10.0 pounds per barrel Wyoming Bentonite | |
| Polyacrylic Acid Level (pounds/ton of bentonite) | Apparent Viscosity in Centipoises |
| zero | 4.5 |
| 1.0 | 19.0 |
| 2.0 | 23.5 |
| 3.0 | 23.5 |
| 4.0 | 21.5 |
| 5.0 | 19.0 |
| 10.0 | 15.5 |
| 20.0 | 14.5 |
| 50.0 | 14.5 |
| 100.0 | 17.0 |
| 200.0 | 22.0 |
| 400.0 | 38.0 |
| Partial Calcium Salt* of Sodium Polyacrylate Level (pounds/ton of bentonite) | Apparent Viscosity in Centipoises |
| zero | 4.5 |
| 1.0 | 13.5 |
| 2.0 | 18.5 |
| 3.0 | 19.0 |
| 4.0 | 21.0 |
| 5.0 | 20.5 |
| 10.0 | 14.0 |
| 20.0 | 13.0 |
| 50.0 | 11.5 |
| 100.0 | 18.5 |
| 200.0 | 31.0 |
| 400.0 | 48.5 |

*Polymer A as described at the bottom of TABLE III

As shown by Table I, the viscosity of the drilling fluid decreases on addition of further polymer, after reaching a peak at between about 2-5 pounds of polymer per ton of bentonite, and does not begin to increase until the addition of between about 50-100 pounds of polymer per ton of bentonite. The peak viscosity reached at low level polymer addition is not again reached until between about 150-250 pounds of polymer per ton of bentonite is added. Such high levels of polymer addition to a bentonite drilling fluid can provide an extremely low-solids drilling fluid having any desired viscosity, without causing an appreciable decrease in viscosity on further polymer addition.

It has been found necessary to add at least about 7% polymer (based on the total weight of bentonite) to reach that viscosity obtainable at very low polymer loadings. The level of polymer addition should be greater than about 10% by weight, and preferably greater than 20% based on the total weight of bentonite, to take full economic advantage of such a high polymer loading to achieve viscosities higher than viscosities obtainable with prior art drilling fluid compositions.

The polymers useful in the practice of the present invention are added to the bentonite-water drilling fluid in an amount greater than about 7% by weight, based on the weight of bentonite, and generally in an amount greater than about 100 pounds per ton of bentonite. The bentonite can be used in amounts as low as about 3.5 pounds per barrel. This polymer percentage is clearly unsuggested by the prior art since, as disclosed by the previously cited patents, (i.e., Lummus U.S. Pat. No. 3,558,545, col. 5) high loading of the polymer gives a drilling fluid having a lower viscosity.

The partial calcium salts of acrylic and partial calcium salts of sodium polyacrylate used in accordance with the present invention should have a viscosity greater than about 10cps. when added to water in an amount of 1% by weight. Preferably the 1% solution of polymer in water should have a viscosity in the range of about 25-50 centipoises.

It has been found that the partial calcium salt of polyacrylic acid and the partial calcium salt of sodium polyacrylate are particularly well suited to increase the viscosity and gelation characteristics when added in amounts greater than about 7% by weight, based on the total weight of bentonite.

The addition of the polymer in such a high percentage permits the production of a drilling fluid having any desired viscosity and gelation characteristics with the proper selection of the amount of polymer and bentonite. I have found two other quite unexpected and desirable characteristics of a drilling fluid having such a high degree of polymer loading. First, the loss of fluid to the surrounding formation is decreased by the addition of polymer, and secondly, the composition unexpectedly improves by heat aging as the drilling fluid is used, especially with respect to filtrate loss.

The composition achieves quite unobvious and unexpected results in terms of filtrate loss to surrounding earth formations. In the prior art drilling compositions the final filtrate loss of the composition is somewhere intermediate between the filtrate which would be lost with bentonite alone and that which would be lost by the polymer alone. I have found that when large quantities of polymer are added to the bentonite-water drilling fluid, the final filtrate loss is approximately half of that experienced by the bentonite-water suspension alone. This is shown in Table II to follow.

Most commercial bentonite, non-drilling fluid quality, produces in the general range of 60–80 barrels of fluid per ton. Drilling mud quality bentonite averages about 100 barrels per ton and "ultra-yield" bentonite, peptized with optimum levels of polymer, reaches 200 barrels per ton. It is virtually impossible to exceed about 275 barrels per ton yield with any known polymer on the basis of slight additions that are used in prior art modified bentonite methods. I find no problem in developing 400–500 barrels per ton with ease. Since this is one-fifth the normal bentonite loading, one would expect to get five times the filtrate loss. Bentonite, by itself, would have a filtrate loss in excess of 50 ccs as measured by API Recommended Procedure 29. The polymer contributes virtually nothing to filtrate loss, and when used alone, gives a filtrate loss in excess of 50 ccs API. Yet, when the two components are put together, with about 7–50% polymer, an interaction occurs and the filtrate loss drops to about 20 ccs as shown in Table II, where the polymer is an equal weight mixture of the partial calcium salt of polyacrylic acid (Polymer A — bottom of Table III) and the partial calcium salt of sodium polyacrylate (Polymer B — bottom of Table III). There is no rational explanation for this.

mates to reduce the filtrate loss to the lowest possible degree. Modified celluloses and humates are not necessary when a partial calcium salt of polyacrylic acid or of sodium polyacrylate is added in the amount disclosed herein. However, they can be added if desired.

I find that my compositions, yielding 400–670 barrels of drilling fluid per ton of bentonite, have filtrate losses that are lower than those of the normal 200 barrel per ton yield bentonite compositions. With normal drilling mud bentonite used at about 6% solids content in water, filtrate loss would routinely run about 13.0 ccs. An equivalent drilling fluid in terms of viscosity and gelling characteristics can be achieved with only 3% solids. Since the bentonite level is halved, the filtrate loss, roughly proportional to the bentonite solids in suspension, is doubled. With a 15 centipoise drilling fluid at this loading in water, we achieve a yield of about 400–670 barrels per ton of drilling fluid from one ton of bentonite. A rate of 400–670 barrels per ton of fluid carries only about 3.5 to 5 pounds of bentonite substance in a barrel of water.

One measure of the efficiency of the polymer used to generate 500-barrel polymer-bentonite fluid is the instrinsic viscosity of polymer and water. A 1% suspension of polymer and water should have a viscosity in excess of 10 centipoises with the optimum lying above 30 centipoises.

The optimum partial calcium salt polymer is one that is high in molecular weight as represented by high viscosity in water solution. "High viscosity" means a viscosity in excess of 25.0 centipoises developed from a 1% suspension of the polymer and water. Lower viscosity polymers down to about 10 cps. can also be used. Additional polymer percentages are necessary when lower viscosity polymers are used in order to achieve the

TABLE II

SUPER YIELD POLYMER - BENTONITE COMPOSITIONS:

Drilling fluids based on bentonite and water:

| Bentonite Level (pounds/barrel) | Apparent Viscosity (centipoises) | Gelation (gms) | Filtrate Loss (ccs) |
|---|---|---|---|
| 22.5 | 16.0 | 11 | 11.0 |
| 18.0 | 11.5 | 9 | 14.3 |
| 12.0 | 6.0 | 6 | 17.9 |
| 9.0 | 4.5 | 3 | 21.6 |
| 6.0 | 3.5 | 2 | 27.8 |
| 3.0 | 3.0 | 1 | 43.0 |

Drilling fluids based on bentonite, polymer and water:

| Bentonite (pounds/barrel) | Polymer Level (pounds/barrel) | Apparent Viscosity (centipoises) | Gelation (gms) | Filtrate Loss (ccs) |
|---|---|---|---|---|
| 3.0 | Zero | 3.0 | 1 | 43.0 |
| 3.0 | 0.1 | 5.5 | 3 | 31.4 |
| 3.0 | 0.25 | 8.5 | 7 | 26.2 |
| 3.0 | 0.5 | 12.0 | 10 | 24.6 |
| 3.0 | 0.75 | 16.5 | 11 | 22.2 |
| 3.0 | 1.0 | 19.0 | 14 | 22.0 |
| 3.0 | 1.25 | 22.0 | 14 | 20.9 |

Same drilling fluids heated and rolled 3 days at 150 degrees Fahrenheit:

| Bentonite (pounds/barrel) | Polymer Level (pounds/barrel) | Apparent Viscosity (centipoises) | Gelation (gms) | Filtrate Loss (ccs) |
|---|---|---|---|---|
| 3.0 | Zero | 3.0 | 1 | 41.2 |
| 3.0 | 0.1 | 4.0 | 4 | 27.5 |
| 3.0 | 0.25 | 6.5 | 3 | 25.0 |
| 3.0 | 0.5 | 10.5 | 5 | 23.3 |
| 3.0 | 0.75 | 13.5 | 9 | 21.8 |
| 3.0 | 1.0 | 16.5 | 11 | 20.6 |
| 3.0 | 1.25 | 19.5 | 9 | 17.8 |

Filtrate loss to the formation is critical. High filtrate loss indicates that a thick, gelatinous film of bentonite solids will form on the interior of the drilled hole, causing friction against the rotating drill pipe. For this reason, it is traditional to use relatively large amounts of bentonite supplemented by modified celluloses or hurequired target of 500 barrels per ton of drill fluid with low filtrate loss. We therefore require more than about 7% polymer based on the total weight of bentonite present in the drilling mud. The preferred polymer is the partial calcium salt of polyacrylic acid.

Various combinations of polymer and bentonite were tested for fluid loss by API Recommended Procedure 29. It was found that neither component by itself is capable of yielding a suitable drill fluid when used in the amount in the combination. Neither component by itself is capable of reducing filtrate loss. But the combination features high viscosity, low solids and low filtrate loss as shown in Table III.

soluble thiosulfate as known in the art. When the polymer is completed, evidenced by the cessation of an exothermic reaction and a change in liquid viscosity, it is then neutralized, for example with caustic soda, soda ash or sodium bicarbonate. The product, sodium calcium polyacrylate, is then mixed with the bentonite.

As an alternative, I begin with acrylonitrile, convert this product to polyacrylonitrile, in the form of a white

TABLE III

500 BARREL MUD SUMMARY 5.0 gms/350 cc = 5 lbs. per barrel = 5.0 pounds per barrel
4.0 gms/350 cc = 4 lbs. per barrel = 4.0 pounds per barrel
15 cps mud from 5 pounds/barrel = 400 barrel per ton
15 cps mud from 4 pounds/barrel = 500 barrels per ton

| Polymer | Bentonite | Age | Apparent Viscosity* | Plastic Viscosity* | Yield Point** | 30 Minute Filtrate Loss (ccs) | Barrels per ton of Bentonite |
|---|---|---|---|---|---|---|---|
| 1.6A | 3.4 | Immediate | 21.5 | 15 | 13 | 22.4 | 400+ |
| 1.6A | 3.4 | Overnight | 21.5 | 15 | 13 | | 400+ |
| 1.25A | 3.75 | Immediate | 19.0 | 14 | 10 | | 400+ |
| 1.25A | 3.75 | Overnight | 19.0 | 14 | 10 | 22.6 | 400+ |
| 1.25A | 3.75 | Hot Roll | 18.0 | 13 | 10 | 22.7 | 400+ |
| 1.0B | 4.0 | Immediate | 17.0 | 12 | 10 | | 400+ |
| 1.0B | 4.0 | Overnight | 18.0 | 14 | 8 | 18.4 | 400+ |
| 1.0B | 4.0 | Hot Roll | 18.0 | 14 | 8 | 17.6 | 400+ |
| 1.3B | 2.7 | Immediate | 20.0 | 14 | 12 | | 500+ |
| 1.3B | 2.7 | Overnight | 21.5 | 16 | 9 | 18.7 | 500+ |
| 1.3B | 2.7 | Hot Roll | 21.0 | 15 | 12 | 19.0 | 500+ |
| 1.0B | 2.0 | Immediate | 16.0 | 8 | 12 | | 670+ |
| 1.0B | 2.0 | Overnight | 16.5 | 12 | 9 | 21.7 | 670+ |
| 1.0B | 2.0 | Hot Roll | 16.0 | 14 | 4 | 22.0 | 670+ |

Component Research:

| Polymer | Bentonite | Age | Apparent Viscosity* | Plastic Viscosity* | Yield Point** | 30 Minute Filtrate Loss (ccs) | Barrels per ton of Bentonite |
|---|---|---|---|---|---|---|---|
| 1.1A | 3.9 | Overnight | 18.5 | 14 | 9 | 22.7 | 400+ |
| 1.1A | — | Overnight | 11.0 | 9 | 4 | 78.6 | |
| — | 3.9 | Overnight | 1.5 | 1 | 1 | 34.9 | |
| 1.0A | 4.0 | Overnight | 14.0 | 10 | 8 | 21.6 | 375± |
| 1.0A | 3.0 | Overnight | 12.0 | 12 | 4 | 21.4 | 400+ |
| 1.0A | 2.0 | Overnight | 16.0 | 11 | 10 | 26.8 | 670+ |

Polymer A (all quantities in parts by weight): 1.0 part of calcium chloride is dissolved in 50 parts by weight of glacial acrylic acid. Then 0.5 parts of ammonium persulfate in 20 parts of water and 1.0 part of sodium thiosulfate in 20 parts of water are added with stirring. The solution is then warmed to initiate polymerization, evidenced by a viscosity increase. 37 parts of sodium carbonate is then added to neutralize. The solution is then heated to about 100° C to evaporate the excess water. The resulting dried polymer is then pulverized.
Polymer B (all parts in parts by weight): 1.0 part of calcium chloride is dissolved in 50 parts of glacial acrylic acid. Then .25 parts of potassium persulfate in 25 parts water and 0.5 parts sodium thiosulfate in 25 parts water are added with stirring. 37 parts sodium carbonate is then added to neutralize. The solution is then heated to about 100° C to evaporate the excess water. The resulting dried polymer is then pulverized.
*centipoises
**pounds per 100 ft.² of drill pipe area Some of these bentonite-polymer combinations were then tested using contaminated field water as shown in Table IV:

insoluble product, and then convert to a polyacrylate salt by hydrolysis with caustic soda, lime, or soda ash as well known. In making the partial calcium salt, I add

TABLE IV

Contaminated Field Water
400 parts per million of calcium sulfate dissolved in water, drilled fluids prepared against a pure water reference.
400 parts per million water then treated with sodium carbonate and drilled fluids prepared again.

Pure Water Reference

| Polymer A(table III) | Bentonite | Age | Apparent Viscosity* | Plastic Viscosity* | Yield Point** | 30 Minute Filtrate Loss (ccs) | Barrels per ton of Bentonite |
|---|---|---|---|---|---|---|---|
| 1.0 | 3.0 | Immediate | 17 | 12 | 10 | 19.3 | 500+ |
| 1.0 | 3.0 | Overnight | 19 | 13 | 12 | 21.8 | 500+ |
| 1.0 | 3.0 | Hot Roll | 17 | 12 | 10 | 19.0 | 500+ |

400 Parts Per Million Calcium Sulfate Contamination

| 1.0 | 3.0 | Immediate | 9.0 | 6 | 6 | 19.0 | 300–400 |
| 1.0 | 3.0 | Overnight | 11.5 | 9 | 5 | 18.1 | 400± |
| 1.0 | 3.0 | Hot Roll | 11.0 | 9 | 4 | 19.1 | 400± |

400 Parts Per Million Calcium Sulfate Solution Neutralized With Soda Ash

| 1.0 | 3.0 | Immediate | 11.0 | 9 | 4 | 19.5 | 400± |
| 1.0 | 3.0 | Overnight | 13.0 | 9 | 8 | 18.7 | 450± |
| 1.0 | 3.0 | Hot Roll | 11.5 | 9 | 5 | 18.5 | 400± |
| 1.5 | 3.5 | Immediate | 16.0 | 13 | 6 | 17.8 | 400+ |
| 1.5 | 3.5 | Overnight | 18.0 | 14 | 8 | 17.5 | 400+ |
| 1.5 | 3.5 | Hot roll | 16.0 | 13 | 6 | 18.3 | 400+ |

*centipoises
**pounds per 100 ft.² of drill pipe area

The preferred polymer is made by reacting acrylic acid with between 3 and 10 mole % calcium chloride to form the partial calcium salt. This forms the mixed calcium acrylate-acrylic acid monomer. The monomer is then polymerized with a soluble persulfate and/or a calcium chloride during polymerization in percentages ranging from about 1–15% of the weight of the stoichiometric amount necessary to fully neutralize the acrylic acid. By using low levels of calcium chloride, I am able to make the partial calcium salt and control the resulting properties of viscosity and filtrate loss.

During or after polymerization, I then neutralize the final product with alkali such as soda ash, dry out the excess water by any suitable means and grind the finished polymer into the composition. In place of drying the final polymer, I may add the gummy polymer liquid to dry clay and grind the two materials together through a mill.

The partial calcium salt of sodium polyacrylate can also be made by partially reacting an acrylic acid monomer with a water soluble calcium compound to form mixed calcium, hydrogen acrylate. The partial calcium salts are superior to the pure polyacrylic acids and polyacrylates with respect to development of yield and filtrate loss when added in an amount greater than about 7% by weight based on the weight of bentonite.

Polyacrylic acid was neutralized with calcium to varying degrees following the procedure set forth for making polymer A described at the bottom of Table III. The results of various levels of addition of partial calcium salts of polyacrylic acid are set forth in the drawing. As clearly shown, when the calcium salt becomes over 20% of the polyacrylic acid, the polymer is rendered virtually insoluble and becomes relatively useless at high polymer loadings. At or below about 15% calcium neutralization, the partial calcium salt of polyacrylic acid, the partial calcium salt of sodium polyacrylate and mixtures thereof exhibit significantly higher viscosities and significantly lower filtrate losses that both the polyacrylic acid and the full calcium salt of polyacrylic acid at loadings of at least 7% based on the weight of bentonite.

To obtain the data set forth in Table V, the partial calcium salt of polyacrylic acid was made in the same manner as the preparation of polymer A as described at the bottom of Table III. The full calcium salt was made in the same manner as the preparation of polymer A as described at the bottom of Table III with the exception that a stoichiometric quantity of calcium chloride was used for reaction with the glacial acrylic acid. The polyacrylic acid polymer was made in the same manner as the preparation of polymer A as described at the bottom of Table III with the exception that calcium chloride was not added for reaction with the glacial acrylic acid.

The polymers so produced were each individually added to bentonite-water mixtures containing 10.0 grams bentonite and 350 grams of water and mixed with an 11,500 r.p.m. agitator. The viscosity of each composition made in this manner was determined immediately after stirring. The polymers were each added in the amounts indicated:

As shown in Table V, by increasing the amount of the partial calcium salt of polyacrylic acid from 4% per ton of bentonite to 8%, the viscosity of an aqueous bentonite drilling fluid is increased 100% whereas the same increase in amount of the prior art polyacrylic acid polymer increased the viscosity of the drilling fluid only 53.3% and increased the viscosity of the drilling fluid containing the full calcium salt of polyacrylic acid only about 7.7%.

Again doubling the amount of each of these polymers to 16% increased the viscosity of the drilling fluid containing the partial calcium salt of polyacrylic acid from 15 to 38 centipoises but only increased the viscosity of the drilling fluid containing polyacrylic acid from 11.5 to 17 centipoises, and actually decreased the viscosity of the drilling fluid containing the full calcium salt of polyacrylic acid from 6.5 to 5.5 centipoises.

Again doubling the amount of each of these polymers from 16 to 32%, increased the viscosity of the drilling fluid containing the partial calcium salt of polyacrylic acid from 38 to 86.5 centipoises but only increased the drilling fluid containing polyacrylic acid from 17 to 26.5 centipoises and only increased the drilling fluid containing the full calcium salt of polyacrylic acid from 5.5 to 8 centipoises.

As set forth in Table I, the results achieved with the partial calcium salt of sodium polyacrylate (polymer B of Table III of the specification) are equally remarkable and unexpected as the results shown with the partial calcium salt of polyacrylic acid. This data shows that the partial calcium salts of both polyacrylic acid and sodium polyacrylate are more than three times more effective than polyacrylic acid and more than ten times more effective than the full calcium salt of polyacrylic acid in increasing the viscosity of aqueous bentonite drilling fluids.

The data set forth in Table VI indicates that an optimum degree of neutralization is in the range of 3–10% and neutralization above about 17% renders the partial calcium salts useless for the purpose of the present invention. In each case 10.0 grams Wyoming Bentonite was mixed with 350 milliliters of distilled water and the polymer added to the slurry. The viscosity was recorded with a Fann viscometer at 600 r.p.m. after each addition had been mixed for 3 minutes:

TABLE VI

| Addition in Kilos per m. ton | Polymer "A" | Polymer "B" | Polymer "C" | Polymer "D" | Polymer "E" |
| --- | --- | --- | --- | --- | --- |
| zero | 7 | 7 | 7 | 7 | 7 |
| 0.5 | 26 | 40 | 41 | 43 | 39 |
| 1.0 | 33 | 45 | 45 | 47 | 40 |
| 2.5 | 35 | 48 | 52 | 55 | 44 |
| 5 | 20 | 41 | 40 | 43 | 42 |
| 10 | 13 | 21 | 20 | 21 | 23 |

TABLE V

| Polymer Addition (pounds/ton of bentonite) | Partial Calcium Salt of Polyacrylic Acid (centipoises) | Polyacrylic Acid (centipoises) | Full Calcium Salt of Polyacrylic Acid (centipoises) |
| --- | --- | --- | --- |
| 0 | 7 | 7 | 7 |
| 2.5 | 16 | 16 | 20 |
| 5 | 17.5 | 19.5 | 16 |
| 10 | 9 | 11.5 | 8.5 |
| 20 | 5.5 | 6.5 | 6.5 |
| 40 | 5.5 | 6 | 6.5 |
| 80(4%) | 7.5 | 7.5 | 6 |
| 160(8%) | 15 | 11.5 | 6.5 |
| 320(16%) | 38 | 17 | 5.5 |
| 640(32%) | 86.5 | 26.5 | 8 |

TABLE VI-continued

| Addition in Kilos per m. ton | Polymer "A" | Polymer "B" | Polymer "C" | Polymer "D" | Polymer "E" |
|---|---|---|---|---|---|
| 25 | 14 | 14 | 14 | 14 | 16 |
| 50 | 15 | 14 | 16 | 16 | 13 |
| 100 | 18 | 19 | 23 | 21 | 14 |
| 200 | 32 | 31 | 40 | 35 | 17 |
| 300 | 25 | 43 | 55 | 52 | 20 |
| 400 | N.D. | 53 | 70 | 64 | 24 |

Polymer "A" - 100% polyacrylic acid
"B" - 2.2% calcium salt of polyacrylic acid
"C" - 4.4% calcium salt of polyacrylic acid
"D" - 8.8% calcium salt of polyacrylic acid
"E" - 17.6% calcium salt of polyacrylic acid

What is claimed as new and desired to be secured by Letters Patent of the United States is:

1. An aqueous clay base drilling fluid composition comprising water, bentonite clay and a polymer effective in increasing the viscosity of a bentonite clay-water suspension selected from the group consisting of a partial calcium salt of sodium polyacrylate, a partial calcium salt of polyacrylic acid and mixtures thereof, said polymer having about 1 to 15% calcium acrylate moieties wherein the polymer is present in an amount greater than about 7% by weight, based on the total weight of bentonite, wherein each polymer, when added to water in an amount of 1% by weight has a viscosity greater than about 10 centipoises.

2. A composition as defined by claim 1 wherein the polymer is present in an amount greater than about 10% by weight, based on the total weight of bentonite.

3. A composition as defined by claim 1 wherein the polymer is present in an amount greater than about 20% by weight, based on the total weight of bentonite.

4. In a method of drilling a well employing a cutting bit and a drilling fluid, the improvement comprising circulating in said well, while driling a fluid having water, bentonite clay and a polymer selected from the group consisting of a partial calcium salt of sodium polyacrylate, a partial calcium salt of polyacrylic acid and mixtures thereof, said polymer having about 1% to 15% calcium acrylate moieties, and wherein the polymer is present in an amount greater than about 7% by weight, based on the total weight of bentonite clay, wherein each polymer, when added to water in an amount of 1% by weight, has a viscosity greater than about 10 centipoises.

5. The combination of claim 4 wherein the polymer is present in an amount greater than about 10% by weight, based on the total weight of bentonite.

6. The combination of claim 4 wherein the polymer is present in an amount greater than about 20% by weight based on the total weight of bentonite.

* * * * *